US008447968B2

(12) United States Patent
Patel et al.

(10) Patent No.: US 8,447,968 B2
(45) Date of Patent: May 21, 2013

(54) AIR-INTERFACE APPLICATION LAYER SECURITY FOR WIRELESS NETWORKS

(75) Inventors: Sarvar Patel, Montville, NJ (US); Ganapathy Sundaram, Hillsborough, NJ (US); Ajay Rajkumar, Morristown, NJ (US)

(73) Assignee: Alcatel Lucent, Paris (FR)

( * ) Notice: Subject to any disclaimer, the term of this patent is extended or adjusted under 35 U.S.C. 154(b) by 1980 days.

(21) Appl. No.: 11/261,399

(22) Filed: Oct. 28, 2005

(65) Prior Publication Data

US 2007/0101120 A1 May 3, 2007

(51) Int. Cl.
*H04L 29/06* (2006.01)

(52) U.S. Cl.
USPC .......................................... 713/151; 380/270

(58) Field of Classification Search
USPC .............. 713/150, 151, 181; 380/28, 48, 247, 380/270
See application file for complete search history.

(56) References Cited

U.S. PATENT DOCUMENTS

| | | | | |
|---|---|---|---|---|
| 4,596,013 A | * | 6/1986 | Tashiro et al. ................. | 370/452 |
| 4,754,482 A | * | 6/1988 | Weiss ............................. | 713/181 |
| 4,803,685 A | * | 2/1989 | Oget ............................. | 714/749 |
| 5,164,941 A | * | 11/1992 | Delaney et al. ............... | 370/447 |
| 5,237,610 A | * | 8/1993 | Gammie et al. .............. | 380/228 |
| 5,412,730 A | | 5/1995 | Jones | |
| 5,638,448 A | * | 6/1997 | Nguyen ........................... | 380/29 |
| 5,689,563 A | * | 11/1997 | Brown et al. .................. | 380/247 |
| 5,719,862 A | * | 2/1998 | Lee et al. ...................... | 370/355 |
| 5,931,961 A | * | 8/1999 | Ranganathan et al. ........ | 714/712 |
| 6,999,429 B1 | * | 2/2006 | Hannu et al. .................. | 370/328 |
| 2002/0136407 A1 | * | 9/2002 | Denning et al. .............. | 380/258 |
| 2003/0200459 A1 | * | 10/2003 | Seeman ........................ | 713/200 |
| 2006/0055963 A1 | * | 3/2006 | Otsuka et al. ................ | 358/1.15 |
| 2006/0056404 A1 | * | 3/2006 | Mueckenheim et al. ..... | 370/389 |
| 2006/0085310 A1 | * | 4/2006 | Mylet et al. .................... | 705/35 |

FOREIGN PATENT DOCUMENTS

| | | |
|---|---|---|
| AU | 2005201982 | 5/2005 |
| EP | 1326367 A1 | 3/2003 |
| JP | 5122196 A | 5/1993 |
| JP | 7038559 A | 2/1995 |
| JP | 2003330366 A | 11/2003 |
| WO | 87/03442 A1 | 9/1986 |
| WO | 01/24436 A2 | 4/2001 |
| WO | WO 03/107706 A1 | 6/2002 |
| WO | 2004/021153 A1 | 3/2004 |

OTHER PUBLICATIONS

"Handbook of Applied Cryptography" Menezes et al., 1997 by CRC Press LLC, pp. 233-237.*
PCT Search Report dated Oct. 4, 2007.
Office Action dated Apr. 17, 2012.
Office Action dated Nov. 14, 2011.

* cited by examiner

*Primary Examiner* — Kambiz Zand
*Assistant Examiner* — John B King
(74) *Attorney, Agent, or Firm* — Williams, Morgan & Amerson

(57) ABSTRACT

The present invention provides a method for encrypting data for transmission over a wireless link. The method includes encrypting at least one block of data, at an air-interface application layer, using an encryption algorithm that receives a cryptosynch as input. The value of the cryptosynch is based on an order of the at least one block of data relative to other blocks of data. The value of the cryptosynch is recoverable by a receiver based on the ordering of the ordering of the blocks of data. The at least one encrypted block of data is transmitted to a receiver that is operable to preserve the order of the at least one block of data relative to the other blocks of data.

42 Claims, 5 Drawing Sheets

AIR-INTERFACE APPLICATION LAYER SECURITY FOR WIRELESS NETWORKS

BACKGROUND OF THE INVENTION

1. Field of the Invention

This invention relates generally to communication systems, and, more particularly, to wireless communication systems.

2. Description of the Related Art

Wireless communication systems are commonly employed to provide voice and/or data communications. Referring to FIG. 1, for example, a wireless communication system 100 generally comprises a wireless network 104 that is operable to communicate with one or more wireless devices 108. In this example, the wireless network 104 and the wireless device 108 communicate over a wireless link 110. Although not shown, the wireless link 110 may include any number of intermediate devices that facilitate wireless communication between the wireless network 104 and the wireless device 108. For example, the wireless link 110 may include repeaters, antennas, routers, satellites, and the like.

Existing and emerging wireless communication systems are generally comprised of heterogeneous collections of air-interface technologies, network architectures, and wireless protocols. For example, wireless communication systems may operate using IEEE-802.11 (WiFi) wireless networks that provide access to local area and "hotspot" networks, IEEE-802.16 (WiMax) networks that provide fixed wireless and mobile broadband access, Evolution Data Optimized networks (1×EVDO) that provide access to third generation (3G) mobile data users, and the like. The diversity present in the different wireless technologies is generally attributable to the context and markets they serve.

In FIG. 1, for example, the wireless network 104 may be a 1×EVDO network providing broadband data access to mobile data users. In this example, the infrastructure of the wireless network 104 may include base transceiver stations (BTS), radio network controllers (RNC), packet data servicing nodes (PDSN), and the like. In this same example, the wireless device 108 may be a mobile unit, such as a cellular telephone, personal data assistant, text messaging device, laptop, and the like. In another example, the wireless network 104 may be an IEEE 802.11 network that includes at least one wireless access point in data communication with a local area network. In general, wireless communication systems 100 may be configured using any known, emerging, or yet to be developed wireless technologies, and these wireless communication systems 100 may be operable with any number of fixed or mobile wireless devices 108.

The Open Systems Interconnection (OSI) is a generally accepted reference model that provides a description of how data (e.g., messages, packets, datagram, frames, etc.) is transmitted between two points in a communication system. For simplicity, the terms "packet", "data packet", and "frame" will be used interchangeably herein to generally refer to data that has been arranged in a known manner, such as an IP frame, Point-to-Point Protocol (PPP) frame, Radio Link Protocol (RLP) frame, Signaling Link Protocol (SLP) frame, or any other known or to be developed data format. In FIG. 1, for example, packets of data may be transmitted between the wireless network 104 and the wireless device 108, in either direction. In this example, the packets may include payload data representative of voice, video, signaling messages, or any other type of information. The protocol used to transmit the packets of data ordinarily specifies a particular frame format (e.g., RLP, IP, SLP, etc.)

Those skilled in the art will appreciate that the OSI reference model defines functional layers that typically take place at each end of a communication session. For convenience, communication processes and/or applications are often categorized into one of the OSI functional layers. For example, layer 4 in the OSI model, the transport layer, includes processes and/or applications responsible for determining, amongst other things, whether all packets have arrived in a given communication session. It should be appreciated, however, that the OSI model is not always strictly adhered to in terms of keeping related functions together in a well-defined layer. Moreover, a given communication session may not include a functional component from each layer of the OSI reference model.

Access networks in wireless communication systems are ordinarily most closely associated with the physical and media access control (MAC) layers of the OSI model. However, wireless networks often have special requirements related to error recovery and bandwidth management. As such, the physical and MAC layers are often supplemented with other layers that relate to additional functions in a wireless communication session. In addition, wireless network signaling mechanisms are often not IP based and are ordinarily specifically tailored to the particular access technology. As a result, wireless access networks often employ a set of functional layers below the network layer that are access technology specific.

FIG. 2 shows an illustrative air-interface layering architecture 200 applicable to a 1×EVDO network. For the purpose of brevity, such air-interface layering is illustrated herein only for a 1×EVDO network. It should be understood, however, that other access networks use similar principles, but with possible variations due to technology differences, implementation considerations, and the like. In short, air-interface layering can be considered as a sequence of logical steps that a packet of data traverses before transmission over a wireless link in a wireless communication system.

Block 204 is representative of the air-interface application layer which generally comprises frame formats that are independent of the particular air-interface. The air-interface application layer frame format is ordinarily IP or PPP. Other frame formats may be used as well. In the context of a 1×EVDO network, air-interface frames include RLP frames and SLP frames. RLP uses a byte-oriented sequence number reflecting the order in which octets are received from a higher layer, usually IP or PPP. Multiple RLP packet sizes are supported by the standard.

The air-interface application layer is typically considered the functional layer associated with the ingress and egress point(s) of a wireless network. In the context of sending a packet of data over a wireless network (i.e., ingress), the air-interface application layer typically receives an IP or PPP frame from a functional layer above. For example, the air-interface application layer may receive an IP packet from a VoIP application. In this case, the air-interface application layer performs its processing and passes the data to the next layer below. For egress, the air-interface application layer typically receives data from a lower functional layer. In this case, the data has ordinarily been transmitted over a wireless link and handed-off to the air-interface application layer after having been processed by lower functional layers. The air-interface application layer processes the data and provides it to a higher layer (not shown), such as a VoIP application.

The data stream layer is shown by box 208. The data stream layer provides a mechanism for distinguishing between different air-interface applications by adding a 2-bit stream identifier header to the data packets in a given communication session. The session layer, represented by box 212, provides address management, air-interface protocol negotiation and configuration, and state maintenance services. Box 216, the connection layer, provides air-link connection establishment and maintenance services.

The security layer, shown by box 220, provides link layer security support. One conventional approach to link layer security in a 1×EVDO network employs a 2-byte cryptosynch added as a header to the connection layer packet. Before transmission, the cryptosynch may be provided as an input to an encryption algorithm (e.g., DES or AES) possibly with other parameters, such as a key, to encrypt the data packet. With this approach, the cryptosynch is ordinarily appended to the data packet and transmitted to the receiver. The receiver may then use the cryptosynch possibly with other parameters, such as a previously agreed to key, to decrypt the packet. Hereafter, the terms "cryptosynch" and "cryptographic synchronization parameter" may be used interchangeably to generally refer to any security parameter that may be used with packet encryption and/or authentication.

If a packet is to be authenticated, a message authentication tag may be computed and added toward the end of the connection layer packet. The addition of a message authentication tag is generally referred to as explicit message authentication. This is because the authentication tag is appended to the packet and transmitted to the receiver. The receiver uses the tag in conjunction with a message authentication algorithm (e.g., iterated cryptographic hash function) to authenticate the message. As will be described below, the addition of a cryptosynch and/or authentication tag to data packets undesirably decreases bandwidth capacity and increases the amount of end processing required in a communication session. This is especially true for time sensitive applications, such as Voice over IP (VoIP).

Moving to box 224, the MAC layer supports air-interface scheduling functions (by the network). In addition, multiple MAC layer payload sizes are supported. The physical layer, shown by box 226, provides channel and error control coding functions. Each layer in the aforementioned air-interface layering architecture supports multiple protocols, and except for the session and connection layers (boxes 212 and 216), each layer typically adds a header to a packet functionally traversing the air-interface layers.

Security is typically an important feature in most, if not all, communication systems. In a banking context, for example, participants engaging in a financial undertaking expect their electronic transactions to be completed as intended without alteration by adversaries (i.e., persons attempting to gain unauthorized access to communications). An adversary may attempt to change the destination and/or value of banking transactions, such that transactions are processed in a manner unintended by the participants. Integrity protection mechanisms are used to prevent an adversary from altering information in a communication unbeknownst to the communication provider and/or the communication participants.

Wireless communications introduce a new degree of security risk over conventional land-based systems. In a wireless environment, adversaries are able to more easily eavesdrop because information is sent over a wireless link that is considered more accessible than conventional land-based channels. As described in FIG. 2, wireless communication systems typically employ some form of link layer security to protect against attacks from adversaries. Although most wireless networks use the Internet Protocol (IP) as the network layer protocol, wireless communication systems (e.g., 802.11, CDMA, WiMax, UMTS, etc.) lack a common framework to link layer security, thus making the various systems incompatible with each other. That is, each wireless communication system typically has its own link layer security standard.

The role of link layer security mechanisms is often complimentary to network layer security protocols, such as IPsec as well as transport layer protocols, such as Transport Layer Security and Secure Socket Layer (TLS/SSL). Typically, network and transport layer protocols tend to offer "end-to-end" security with a view towards protecting user data from eavesdropping and modification. Network layer security, such as IPsec, is a relatively resource taxing mechanism to implement.

Link layer security protocols are often designed to protect network providers and users from fraud at the access layer, apart from offering privacy as well as protecting the network. For example, in the absence of link layer encryption and/or packet authentication, even in the presence of end-to-end IPsec, and adversary could steal service by posing as a legitimate user. This is primarily due to the fact that data networks are "packet switched" and shared by many users. Entity authentication and authorization are useful to grant admission to legitimate users, but do not prevent imposters from stealing service, since data traffic is served in bursts and not continuously.

As previously mentioned, link layer security mechanisms are generally access technology specific. For example, link layer security mechanisms used for 1×EVDO networks are incompatible with 802.11 networks, thus making it more challenging, if not impossible, for a user to seamlessly transition from one access technology to another. This incompatibility results in providers making additional investments in software, hardware, and maintenance/management expenditures.

With time sensitive applications, such as VoIP and video, a balance is required between security and efficiency. Such applications require data to be delivered and processed within predetermined timing guidelines to function properly. Conventional security mechanisms often have an undesirable consequence of contributing to timing delays for time sensitive applications. Security induced timing delays are ordinarily the result of the additional processing and consumption of resources required to implement the security mechanism. Moreover, traditional link layer security mechanisms necessitate packet expansion to accommodate the addition of a cryptosynch to the data packet before transmission. As described, the cryptosynch may be used for encryption and/or message authentication.

Packet expansion is particularly problematic for full rate voice packets because, as will be shown below, encrypted link layer VoIP packets may not fit into a physical layer frame. FIG. 3 illustrates the aforementioned packet expansion problem that may be encountered using conventional link layer security mechanism in a 1×EVDO network. In this example, a VoIP packet is shown traversing various air-interface layers, including the 1×EVDO security layer described in FIG. 2. For ease of description, reference numerals 1-5 have been added to the Figure to more easily identify certain steps. It should be appreciated, however, that FIG. 3 is a simplified representation intended only to illustrate the problem of packet expansion. Likewise, FIG. 3 is not intended to be an exhaustive representation of all the steps a packet may take in preparation for transmission over a wireless link.

At step 1, the VoIP packet is received by the air-interface application layer. Robust Header Compression (ROHC) is applied, and at step 2, the packet is shown reduced to 208 bits. Shown at step 3, the 1×EVDO standard proposes the use of a 14-bit header for RLP. In one embodiment, the RLP header is comprised of 5 bits for LinkflowID, 1 bit for direction, 2 bits to indicate last and first frames, and 6 bits to indicate a sequence number of the packet.

As described above, at step 4, link layer security in 1×EVDO necessitates packet expansion to accommodate an explicit 2-byte cryptosynch 300 as overhead. The cryptosynch is appended to the data packet, and transmitted therewith to a receiver (e.g., wireless device). The receiver uses the cryptosynch and possibly a secret key to decrypt the data packet.

At step 5, once a Cyclic Redundancy Code (CRC) and 2-bit MAC header are added to the packet, the packet assumes a length of 272 bit. As such, full rate voice frames will not fit into a 256-bit physical layer frame, but if the same packet is transmitted unencrypted (i.e., without the 2-byte cryptosynch) then it will exactly fit into a 256-bit frame. In the case of 1×EVDO systems, the packet expansion forces the use of the next higher physical layer packet size, which in one application is 512 bit, thus doubling the physical layer packet size, in this illustrative example.

In an effort to satisfy delay requirements for time sensitive applications, link layer security mechanisms are typically implemented close to the physical layer. This is shown, for example, in the 1×EVDO air interface layering architecture of FIG. 2. Unfortunately, link layer security mechanisms that are implemented in this manner are usually unable to effectively separate signaling applications from other user data applications. As a result, providers have limited ability to customize encryption and authentication for different streams of data. For example, wireless access providers could choose to authenticate every signaling message but provide encryption with no explicit authentication for user data packets. Moreover, a user may insist that best effort packets are encrypted and authenticated over the wireless link, but may choose not to authenticate every VoIP packet. With current link layer security mechanisms applied so close to the physical layer, such separation is difficult, if not impossible, without incurring layer violation.

What is needed, therefore, is a security mechanism that operates relatively independent from the underlying access technology, as compared with conventional security mechanisms. The security mechanism should be applicable to most, if not all, wireless access technologies. Moreover, the security mechanism should provide some degree of flexibility, while reducing the overhead required with conventional security and/or authentication mechanisms.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for encrypting data for transmission over a wireless link. The method includes encrypting at least one block of data, at an air-interface application layer, using an encryption algorithm that receives a cryptosynch as input. The value of the cryptosynch is based on an order of the at least one block of data relative to other blocks of data. The value of the cryptosynch is recoverable by a receiver based on the ordering of the at least on block of data. The at least one encrypted block of data is transmitted to a receiver that is operable to preserve the order of the at least one block of data relative to the other blocks of data.

In another embodiment of the present invention, a method is provided for decrypting data received over a wireless link. The method includes receiving at least one packet used to transmit at least one encrypted block of data over the wireless link. The blocks of data are encrypted using an encryption algorithm that receives a cryptosynch as input. The value of the cryptosynch is based on an order of the at least one block of data relative to other blocks of data. At an air-interface application layer, the cryptosynch for the at least one encrypted block of data is recovered from the ordering of the at least one block of data relative to other blocks of data.

BRIEF DESCRIPTION OF THE DRAWINGS

The invention may be understood by reference to the following description taken in conjunction with the accompanying drawings, in which like reference numerals identify like elements, and in which.

Figure 1:
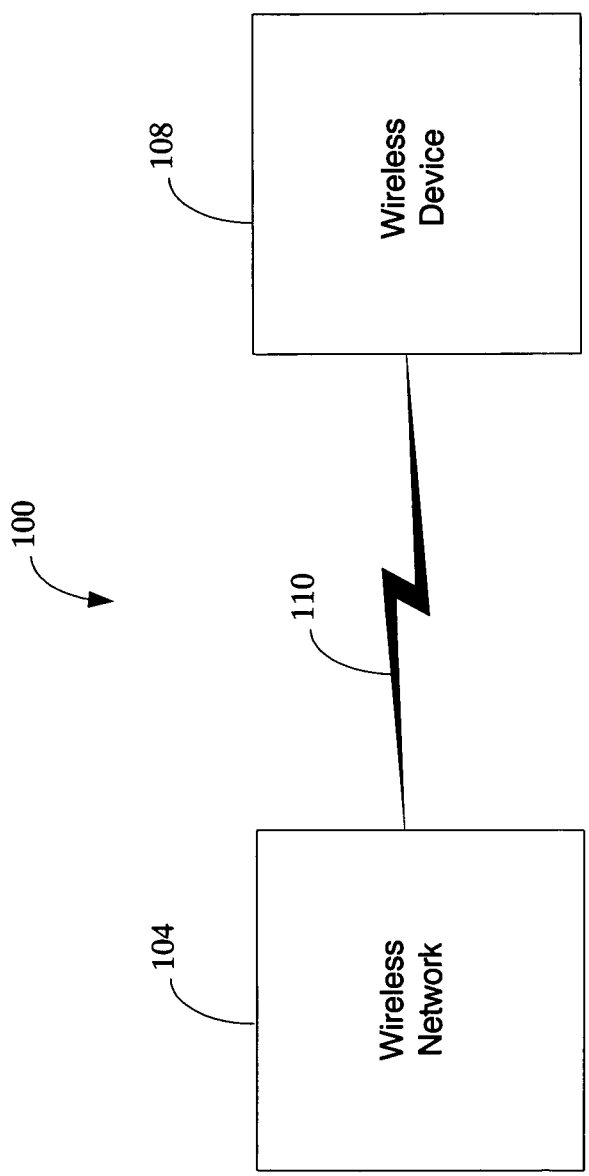
FIG. 1 illustrates a simplified box diagram of an exemplary wireless communication system.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result.

The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Air-interface application layer security ($A^2LS$) supports encryption and explicit message authentication for most, if not all, air-interface applications, including signaling. Moreover, it also supports implicit message authentication, which, as will be described more fully below, may be considered a special mode of encryption. As the name implies, $A^2LS$ operates at a functional layer that is further removed from the physical layer, as compared to conventional link layer security mechanisms. As such, $A^2LS$ is relatively more flexible and may be applied across most, if not all, wireless access technologies.

In general, explicit message authentication mechanisms include computing a cryptographic hash of a message and attaching it as a tag at the end of a packet. Typically, tags are attached to packets to guarantee the integrity of the message. As described for time sensitive applications, such as VoIP, the addition of tags may lead to adverse increases in delays and reduce the overall capacity of a network. Implicit message authentication avoids this problem by adding no extra tag. Moreover, implicit message authentication, in the context of $A^2LS$, does not require appending a cryptosynch to a packet so that the message may be decrypted by a receiver. However, even when a cryptosynch is appended to a packet and transmitted to a receiver, implicit message authentication provides the advantage of eliminating the transmission of an explicit message authentication tag.

As will be described below, a cryptosynch may be derived at the receiver for a given block of data based on an ordering of the block of data relative to other blocks of data. For example, the protocol in a 1×EVDO network relies on a link layer sequence number to insure that the ordering of data at a receiver is synchronized with the order it was transmitted. In this illustrative example, the link layer sequence number adds no additional overhead due to security and/or authentication considerations. Other wireless protocols may use similar mechanisms, such as control channels, header information, or other ordering parameters, to insure that the ordering of data at the receiver is synchronized with the order it was transmitted. $A^2LS$ takes advantage of this ordering feature present in most, if not all, wireless protocols to derive the applicable cryptosynch at the receiver so that it does not have to be explicitly transmitted.

Figure 4:
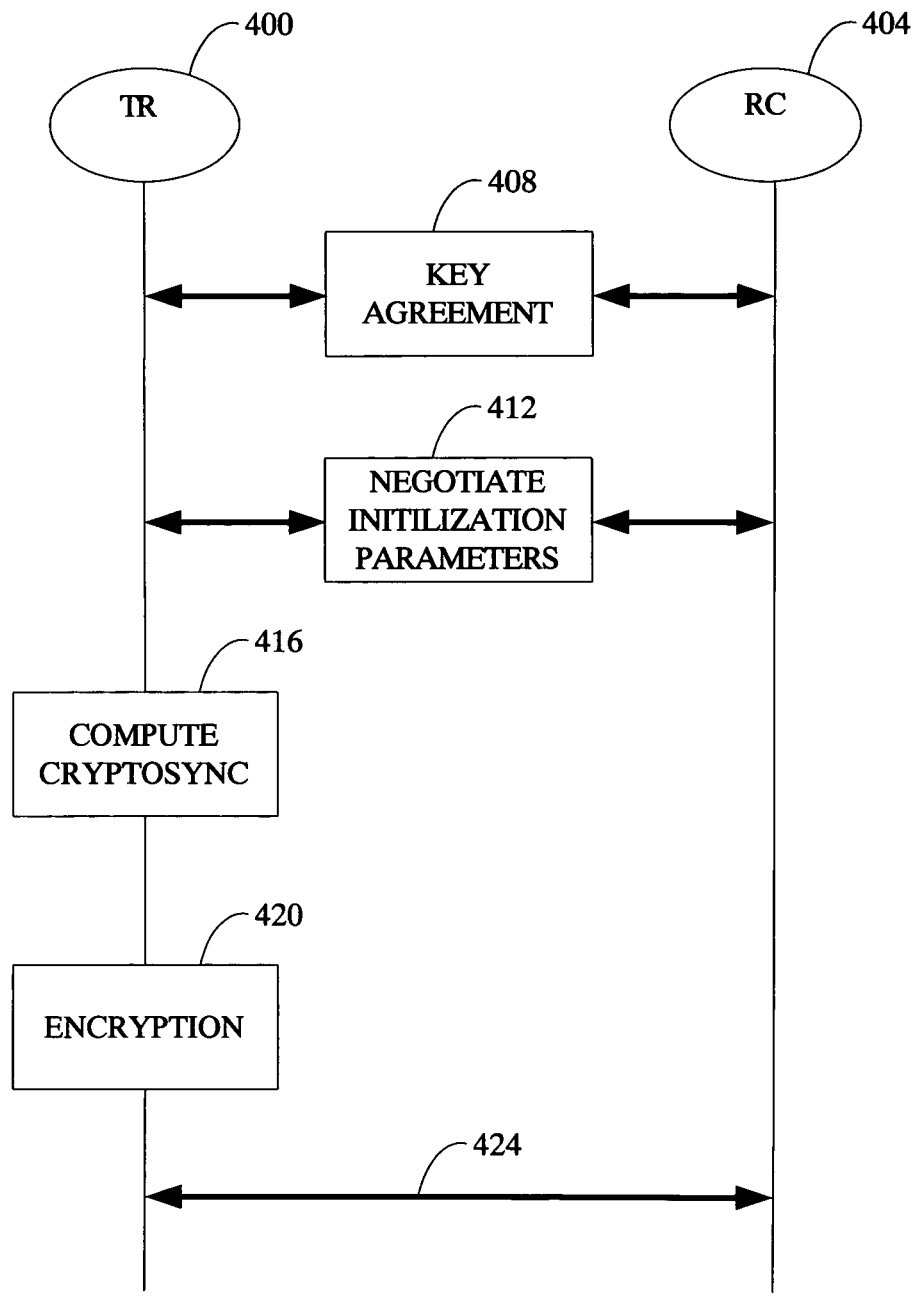
FIG. 4 conceptually illustrates one exemplary embodiment of a method of encrypting data for transmission over a wireless link, in accordance with one embodiment of the present invention.

FIG. 4 conceptually illustrates one exemplary embodiment of $A^2LS$. In the illustrated embodiment, a transmitter 400 and a receiver 404 are in data communication in a wireless communication system. As previously described the wireless communication system may be implemented using any number of different wireless technologies, such as CDMA, IEEE-802.11, IEEE-802.16, 1×EVDO, etc. Likewise, the receiver may be comprised of any number of wireless devices, such as a cellular telephone, personal data assistant, text messaging device, laptop, and the like. For the ease of illustration, specific reference may be made throughout this disclosure to certain components in a 1×EVDO network. Such references are meant to provide easy to follow examples, and are not intended to limit the present invention.

In the forward link, the transmitter 400 may be a wireless network, and the receiver 404 may be a wireless device. In the reverse link, the transmitter 400 may be the wireless device, and the receiver 404 may be the wireless network. In short, the designation of "receiver" and/or "transmitter" is one of convenience that may vary depending upon the direction of data communication in a wireless communication system.

In most, if not all, wireless communication systems, the transmitter 400 and the receiver 404 share a password that is ordinarily agreed to out of band. For example, a wireless user may enter into a subscription agreement with a wireless carrier, and upon new activation, the password may be stored in the user's wireless device. Ordinarily, for each communication session, the transmitter 400 and the receiver 404 create a key. In general, the parameters for key exchange, along with the exact message formats and network elements involved may vary as a matter of design choice.

In FIG. 4, the key agreement is illustrated at block 408. After the key agreement 408, the key may be used, for example, to authenticate a wireless device to a wireless network. In one illustrative embodiment, the transmitter 400 and the receiver 404 execute a version of Password Authenticated Key (PAK) exchange. PAK is a password authenticated key agreement protocol based on the Diffie-Hellman key exchange. If desired, PAK may be tied to existing authorization mechanisms.

Following the key agreement 408, the transmitter 400 and the receiver 404 negotiate a variety of initialization parameters related to security and/or authentication, as indicated by box 412. The initialization parameters may include, for example, security levels, security algorithms, values of virtual counters, and any other parameter. With security levels, the negotiation may include a determination as to what levels are to be applied to certain streams of data. As described, $A^2LS$ provides the flexibility of separating air-interface applications and securing them differently. In one illustrative embodiment, the levels of security may include null (no encryption or message authentication), simple encryption (encryption with no message authentication), implicit message authentication (encryption and authentication with no authentication tag and with or without an explicit encryption header), and encryption and authentication (simple encryption and explicit message authentication).

Certain initialization parameters may be set to default values so that even without a successful negotiation 412, the transmitter 400 and the receiver 404 may communicate using the default values. In one illustrative embodiment, voice, video, and other time sensitive multimedia services may be set to use implicit message authentication. As will be described more fully below, implicit message authentication does not require an explicit cryptosynch and/or authentication tag to be transmitted with a packet of data, thus increasing network capacity and reducing the processing burden by the transmitter 400 and the receiver 404. In this same example, all other types of data services may be set to use encryption and explicit authentication.

Encryption algorithms may also be set to a certain default value. Although any encryption algorithm may be used, in one illustrative embodiment, the Advanced Encryption Standard (AES) and the Secure Hash Algorithm (SHA-1) may be set as the default values to support encryption and authentication, respectively. As will be described below, virtual counters may be used to derive a variable portion of a cryptosynch. As a default setting, the virtual counters may be set to zero at the beginning of each communication session.

Figure 2:
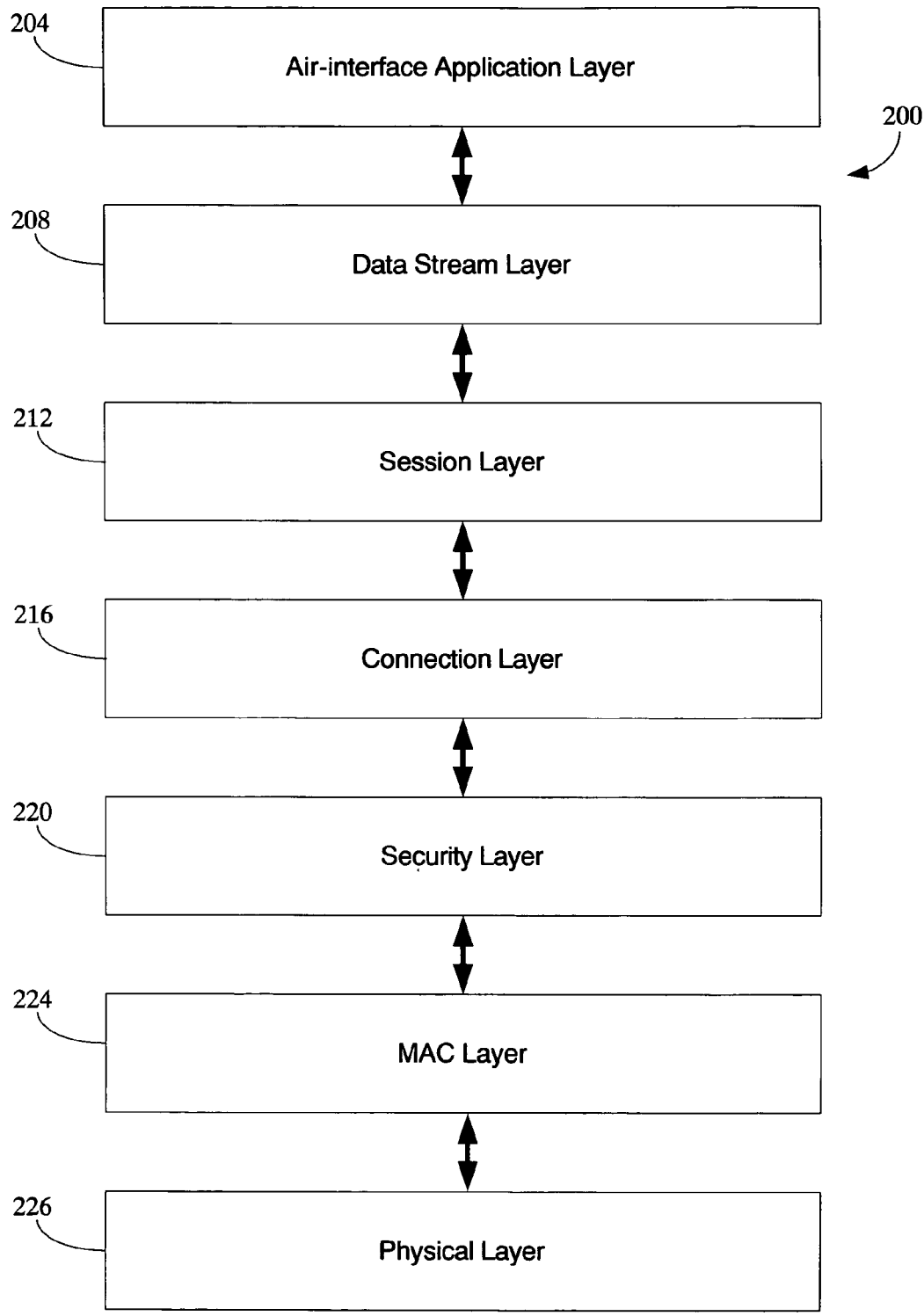
FIG. 2 conceptually illustrates an exemplary air-interface layering architecture applicable to a 1×EVDO network.
Figure 3:
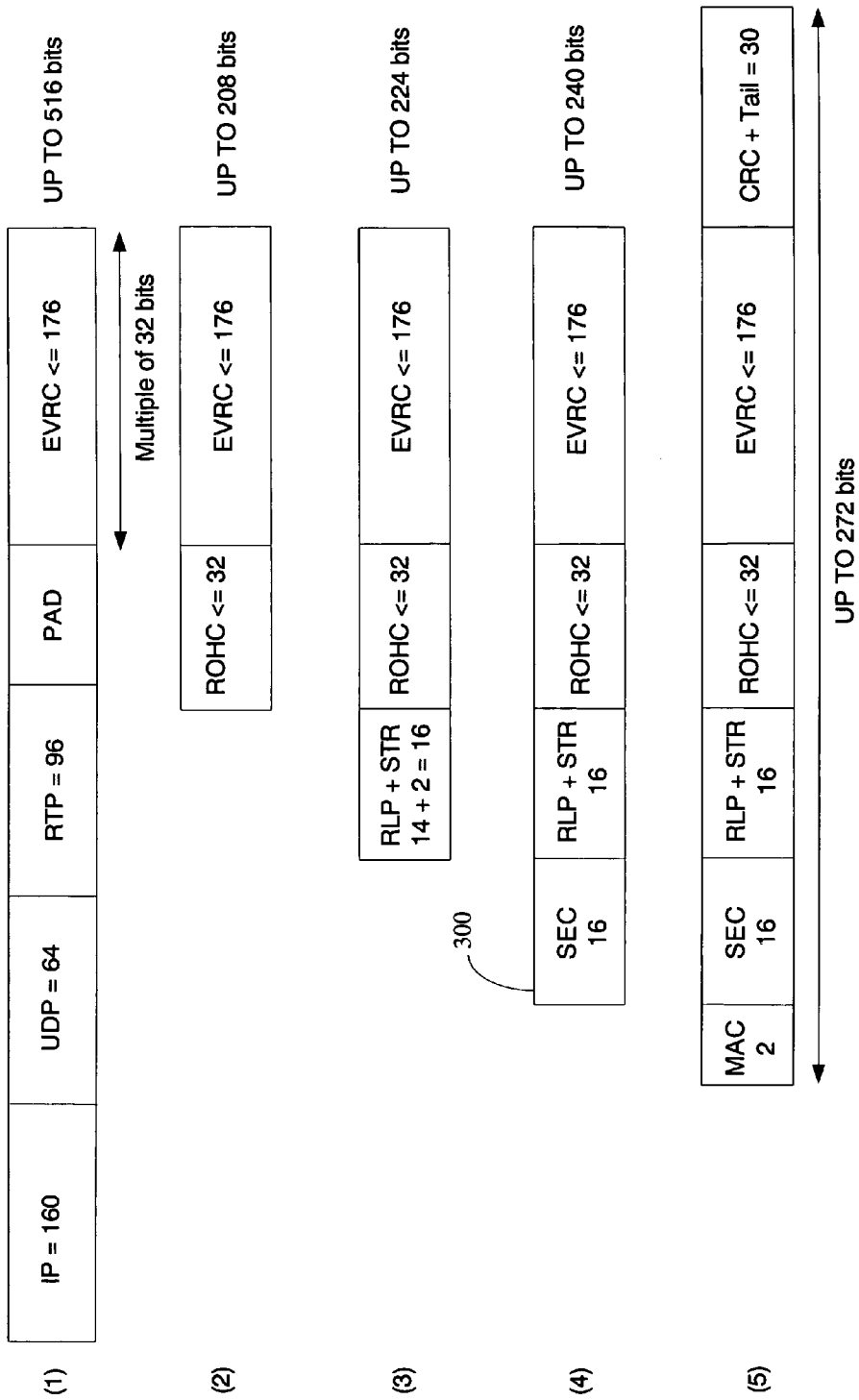
FIG. 3 is a simplified representation of packet expansion.

At the transmitter 400, a data stream is received for transmission to the receiver 404. Ordinarily, the data stream is comprised of packets (e.g., IP, PPP, etc.) from signaling and bearer data applications. In the context of a 1×EVDO network, the data stream may be a VoIP data stream that is received by the air-interface application layer 204, illustrated in FIG. 2. For convenience, the data stream may be referred to as a plaintext stream to denote that it includes data received from an upper layer that has not yet been processed by an encryption and/or authentication algorithm.

At block 416, a cryptosynch is computed that may be used by an encryption algorithm and/or authentication algorithm to prepare the data stream for transmission to the receiver 404. It should be appreciated that any number of algorithms may be used to compute the cryptosynch and that the particular characteristics of the cryptosynch, such as bit length, randomness, etc., may vary as a matter of design choice. In one illustrative embodiment, a cryptosynch is computed for each data stream to be transmitted to the receiver 404.

Although no specific format is required, the cryptosynch may be computed using a fixed component and a variable component. Using a variable component, a randomness factor may be introduced to the cryptosynch that makes it more difficult for an adversary to mimic and also renders the transmitted data less susceptible to dictionary attacks. The specific data making up the fixed and variable components of the cryptosynch may vary as a matter of design choice. However, as will be described below, the cryptosynch may be derived so that it bears a predetermined relationship with control information that ordinarily accompanies data packets transmitted over a wireless link. For example, the cryptosynch may be derived having a predetermined relationship to control parameters, such as packet header information, that accompanies the packet pursuant to a wireless standard, such as CDMA, 1×EVDO, etc. In doing so, the cryptosynch may be recovered by the receiver 404 and used for decryption and/or authentication without having to be explicitly transmitted thereto.

The fixed component of the cryptosynch may be inferred from control information that accompanies the packet pursuant to a particular wireless standard. In one illustrative embodiment, the fixed component of the cryptosynch is an application stream identifier and is fixed for a given stream of data. The application stream identifier may be comprised of any number of bits. However, in a 1×EVDO network, the application stream identifier may be an RLP flow identifier of 7 bits in length. An eighth bit may be added to the fixed component as a directional bit. The directional bit may be used to signify whether the transmission is in the forward link (also known as downlink) or the reverse link (also known as uplink). In one illustrative example, 0 is used for the forward link and 1 is used for the reverse link. Ordinarily, the fixed component of the cryptosynch will include a bit length that is some multiple of 8.

The variable component of the cryptosynch may be derived from a virtual counter that is configured to increment a block number after a predetermined block of bits from a data stream have been received. For example, in a 1×EVDO network, the air-interface application layer receives data in a certain order, and the same order is ordinarily maintained for encryption and authentication before the data is delivered to the link layer for transmission to the receiver 404. Accordingly, the data stream may be broken down into "blocks" of a predetermined bit length, "b". In one example, the virtual counter is incremented by one every b bits.

The bit length of the blocks (i.e., the value of the variable b) may be assigned any value and may vary as a matter of design choice. In one embodiment, the default choice for b is 128, which coincides with the block length of the exemplary default encryption algorithm, AES. In this case, the virtual counter may be incremented for each block of 128 bit in the data stream. Because it is efficient to operate in terms of byte boundaries, the default minimum size for b may be specified at 8 bits.

The variable component of the cryptosynch may be set to any bit length. It should be appreciated, however, that the bit length of the variable component influences how often the virtual counter will recycle for a given data stream. For example, in one illustrative embodiment, the variable component may be set to a bit length of 7 bytes. Therefore, after $2^{56}$ blocks of bits have been received, for any given data stream, the virtual counter will recycle. If a virtual counter larger than 7 bytes is desired, this can be negotiated, for example, at block 412, or can be pre-specified as a default value. As such, it should be appreciated that 64 bits for the cryptosynch (8 bits for the fixed component and 56 bits for the variable component) is just one exemplary embodiment that may be used with the present invention.

Using the virtual counter, each byte in a data stream may be identified using a block number and byte number within the block. Continuing with the example above, where b (block bit length) is equal to 128 bit, byte 173 of a given data stream may be identified as 10.12, where, counting from zero, the designation indicates that byte 173 of the data stream is byte 12 of block 10. Likewise, byte 174 of the data stream is byte 13 of block 10, and so on.

It should be appreciated that if b is set to 128 bit the resulting block is comprised of 16 bytes (i.e., bytes 0-15). Applying this case to the 1×EVDO example above, bytes 173, 174, 175, and 176 in a given data stream may be encrypted using a cryptosynch value derived from the direction bit, RLP flow identifier, and a block number equal to 10. Likewise, bytes 177 through 192 may be encrypted using a cryptosynch value derived from the direction bit, RLP flow identifier, and a block number equal to 11.

Data delivered to a receiver's link layer is not guaranteed to be delivered in the same order it was transmitted over the wireless link. The problem is typically resolved in wireless standards via an ordering mechanism in the wireless protocol. In a 1×EVDO network, for example, data is ordered using an explicit sequence number associated with the link layer packets. Continuing with the 1×EVDO example, RLP packets contain a byte number of the RLP stream as the sequence number. For example, if an RLP packet with a sequence number 173 is received, the receiver 404 would identify the first byte of the incoming data stream as 10.12, pursuant to the exemplary convention described above. In other words, using the sequence number already associated with the packet pursuant to a wireless standard, the receiver is able to synchronize its block count with the transmitter and recover the cryptosynch for incoming blocks of data. The initial values of the counter, the bit length of the blocks (designated above as variable b), and any other security parameter may be negotiated, as illustrated at block 412, or set to a previously agreed to default value.

At the receiver 404, link layer protocols use the sequence number to insure that the data is arranged in the same order it was transmitted (i.e., the receiver 404 is synchronized with the transmitter 400). The sequence number may then be used by a higher layer in the air-interface protocol, such as the air-interface application layer in a 1×EVDO network, to derive the virtual counter value for decryption purposes. Again, because data is arranged at the receiver 404 in substantially the same order it is was transmitted, the receiver 404 and the transmitter 400 are synchronized, and the virtual counter values recovered by the receiver 404 will be the same values used to encrypt the blocks at the transmitter 400. In the 1×EVDO example above, an illustration was provided for recovering the block count for bytes 173-176 (count value 10) and bytes 177-192 (count value 11). Accordingly, if AES is used as the encryption algorithm, bytes 173-176 may be decrypted using the $12^{th}$ through $15^{th}$ bytes of AES counter output using a cryptosynch value derived from the direction bit, RLP flow identifier, and block number equal to 10. Likewise, bytes 177 through 192 may be decrypted using the $0^{th}$ through $15^{th}$ bytes of AES counter output using a cryptosynch value derived from the direction bit, RLP flow identifier, and block number equal to 11.

Referring back to FIG. 4, at block 420, the computed cryptosynch may be used to encrypt a data stream before it is transmitted over a wireless link. Any agreed upon encryption algorithm may be used to encrypt a plaintext stream. As will be described below, an implicit message authentication algorithm may be used that achieves both encryption and message authentication, although the latter is not explicit. However, a number of other encryption algorithms may be employed as well.

In one illustrative embodiment, an encryption algorithm, such as AES, produces a pseudorandom stream of bits using the derived cryptosynch as input. The encryption algorithm may also use any number of additional parameters as inputs, such as the key selected by the transmitter 400 and receiver 404 during the key agreement 408. In one example, the key may be a pseudorandom sequence of 128 bit known only by the transmitter 400 and the receiver 404.

A cipher text stream (i.e., an encrypted data stream) may be obtained by performing a logical XOR of corresponding bytes of the plaintext stream and the pseudorandom stream. The cipher text stream may then be passed on to the link layer for transmission to the receiver 404. Transmission to the receiver is indicated in FIG. 4, by arrow 424.

As described above, the receiver 404 may receive bytes out of order, but it is the role of the link layer protocols to order the received data before sending it to upper layers. Moreover, wireless link layer protocols, such as RLP in 1×EVDO, do not guarantee delivery of packets, and these protocols typically leave it to the transport layer protocols, such as TCP, to recover from errors. For example, if a link layer packet is lost, the link layer is expected to deliver a sequence of bits whose length is the same as the lost packet. For example, the protocol may be configured to deliver a sequence of zero bits having a bit length equal to the length of the lost packet. These procedures ensure that the upper layers, such as the air-interface application layer, will maintain synchronization between the transmitter 400 and the receiver 404. As described in the example above for 1×EVDO networks, the receiver may recover the cryptosynch using sequence numbers of the received packets. Because the receiver 404 and the transmitter 400 are in synch, the receiver is able to generate the pseudorandom stream using the same cryptosynch values, key, and/or any other encryption parameter. In this encryption example, the pseudorandom stream is XOR-ed with the cipher text stream to obtain the plain text stream.

It should be appreciated that the selection of counter mode encryption is just one of many possibilities and that the selected encryption algorithm may vary as a matter of design choice. For example, other modes of encryption, such as Output Feedback mode, are equally applicable. Moreover, certain encryption algorithms require inputs to be a certain bit length. For example, AES requires its inputs to be 128 bit in length. In the example described above, a 64-bit cryptosynch was described. In this case, the cryptosynch may be padded with a trailing or leading set of 64 bits, in order to create a 128-bit input value. The padding can be any known quantity, such as trailing zero bits or any other value.

As described above, explicit message authentication mechanisms typically include attaching a computed authentication tag to the end of a packet. Ordinarily, tags are attached to every packet in order to guarantee the integrity of the message. Explicit message authentication may be used with the aforementioned method of recovering the cryptosynch at the receiver from the ordering of the data. In this illustrative example, an explicit authentication tag is computed and appended to the data transmitted to the receiver. The receiver recovers the cryptosynch from the ordering of the received blocks of data and authenticates the data using the explicit message authentication tag.

Implicit message authentication, in the context of $A^2LS$, is an encryption mode that also includes an implicit authentication component that does not require a packet to be appended with a tag. With implicit message authentication, a plaintext stream is received for transmission to a receiver. An encryption algorithm is used to produce a first pseudorandom stream and a second pseudo random stream. For ease of reference, the first pseudo random stream may be referenced using the variable 'A', while the second pseudorandom stream may be referenced using the variable 'B'.

To generate the first and second pseudo random streams, the cryptosynch may be modified by a modification parameter that is either known or capable of being determined by the receiver 404. For example, the modification parameter may be negotiated, at block 412, or set to default values. In one illustrative embodiment, the cryptosynch is derived in the manner described above, and to produce the first and second pseudorandom streams, the cryptosynch may be followed by a 0 or 1, respectively. In other words, the modification parameter is a one bit value that may be set to 0 (first pseudorandom steam) or 1 (second pseudorandom stream).

As previously described, the cryptosynch may be derived from a virtual counter that is configured to increment a block number after a predetermined block of bits from the plaintext stream have been received. In this case, a cipher text stream (i.e., an encrypted data stream) is produced by taking a block of plaintext, which may be referenced using the variable 'X', and performing the operation $Y=AX+B$, where the operation is performed in a finite field (i.e., Galois Field) of order $p^n$, where p is a prime number and n is an integer. The operator '+' is the Boolean operation XOR, which those skilled in the art will appreciate is the same as addition in a Finite Field $2^n$.

In the example described above for a 1×EVDO network, where the encryption algorithm is AES and the block bit length is 128 bits, a cipher text stream may be produced by performing the aforementioned operation in $GF(2^{128})$. In this example, the plain text stream is broken into 128 bit blocks, and as described above, a virtual counter identifies a block count for each data stream. The first and second pseudorandom streams may be produced by applying the cryptosynch, appended with a 0 for the first pseudorandom stream and a 1 for the second pseudorandom stream, to the AES encryption algorithm.

Encryption without implicit message authentication is equivalent to A=1 for all blocks. In this case, cipher text is produced by the operation $Y=X+B$, where + is the Boolean operation XOR. This mode of encryption undesirably allows an adversary to alter chosen bits of the plaintext, by adding some value to the cipher text. For example, an adversary may add a value Δ to the cipher text. As a result, the cipher text may be decrypted as X+Δ, which is meaningfully related to the plaintext.

Using the aforementioned operation in implicit message authentication, an adversary can no longer alter chosen bits of the cipher text since Y+Δ will be decrypted as $X+\Delta A^{-1}$, where A is unknown to the adversary. In other words, after the alteration of the cipher text, the decrypted value is no longer meaningfully related to the plaintext since A is pseudorandom. For example, for VoIP, the voice data has redundancy such that a random change would cause the voice data to become meaningless and hence an implicit authentication is provided. This property is generally referred to as non-malleable encryption.

Ordinarily, data streams received at the air-interface application layer are packets, such as IP packets, PPP packets, signaling packets, etc. In some cases, it may be that the air-interface application layer packet will not fit into a single link layer packet. For example, the block bit length (denoted by variable b) specified in implicit message authentication may be 128 bits, but the data stream received for transmission to may not be a multiple of 128. In such cases, the length of the pseudorandom streams A and B, used to produce the cipher text, may be adjusted to account for this contingency.

To illustrate, a packet of data may be received at the air-interface application layer having a bit length equal to K*b+ L, where L is positive and less than b. In this case, the first K blocks of data may be encrypted using b-bit values for pseudorandom streams A and B. The last L bits are encrypted using L-bit values for pseudorandom streams A and B from the respective pseudorandom streams. However, some mechanism must be used to signal to the receiver that the packet is not even multiple of length b. In one illustrative embodiment, once the cipher text is prepared for the packet, a packet length indicator may be added to signal the length of the packet. For example, the length indicator may be a 2-byte preamble (i.e., header) added to the packet. Alternatively, the length indicator may be added as a post-amble (i.e., footer) to the packet. The cipher text packet, including the length indicator, is then passed on to the link layer for transmission.

The length indicator does incur some overhead. In the example above, a 2-byte overhead is incurred for every application layer packet (e.g., a 2-byte overhead is incurred for every PPP packet or video frame). However, this overhead is considerably less than the 2-byte overhead incurred for every MAC packet, if encrypted using conventional security mechanisms.

The receiver 404 receives the cipher text data from the link layer in the same order it was transmitted. Again, it is the role of the link layer protocols to insure proper ordering before sending the data to upper layers. As described above, the variable component of the cryptosynch may be recovered. With the recovered value, the receiver may generate the pseudorandom streams, using the same key and cryptosynch values, which are then used to decrypt the cipher text packet. For implicit message authentication, the plaintext stream may be obtained using the operation $(Y+B)A^{-1}$, where Y is the cipher text block and A and B are pseudorandom blocks from the A and B pseudorandom streams, respectively.

As an alternative to adding an explicit length indictor to the cipher text stream, a start flag and an end flag may be added to the frame. The start and end flags may be a bit sequence comprised of any bit length having a predefined value. In one illustrative embodiment, the start flag and the end flag share the same fixed value and are 8 bits in length (i.e., the start flag is a start byte and the end flag is an end byte). Continuing with this example, if the value of the start/end byte is found in the payload of the frame, then the "collision" is resolved by replacing the bits in the payload of the frame with some predetermined bit sequence that is different from the start and end flags. At the receiver, the payload data is restored to its original state. This procedure is generally referred to as bytestuffing. One advantage to this approach is that the receiver 404 may recover from lost packets by looking for start and end flags in subsequent packets. Once the packet is received, the receiver may derive the length of the packet by counting the number of bits between the start and end flags. Depending upon the particular application, the derivation of the packet length may include adjustment calculations to take into account header data, control data, or any other miscellaneous bits.

Figure 5:
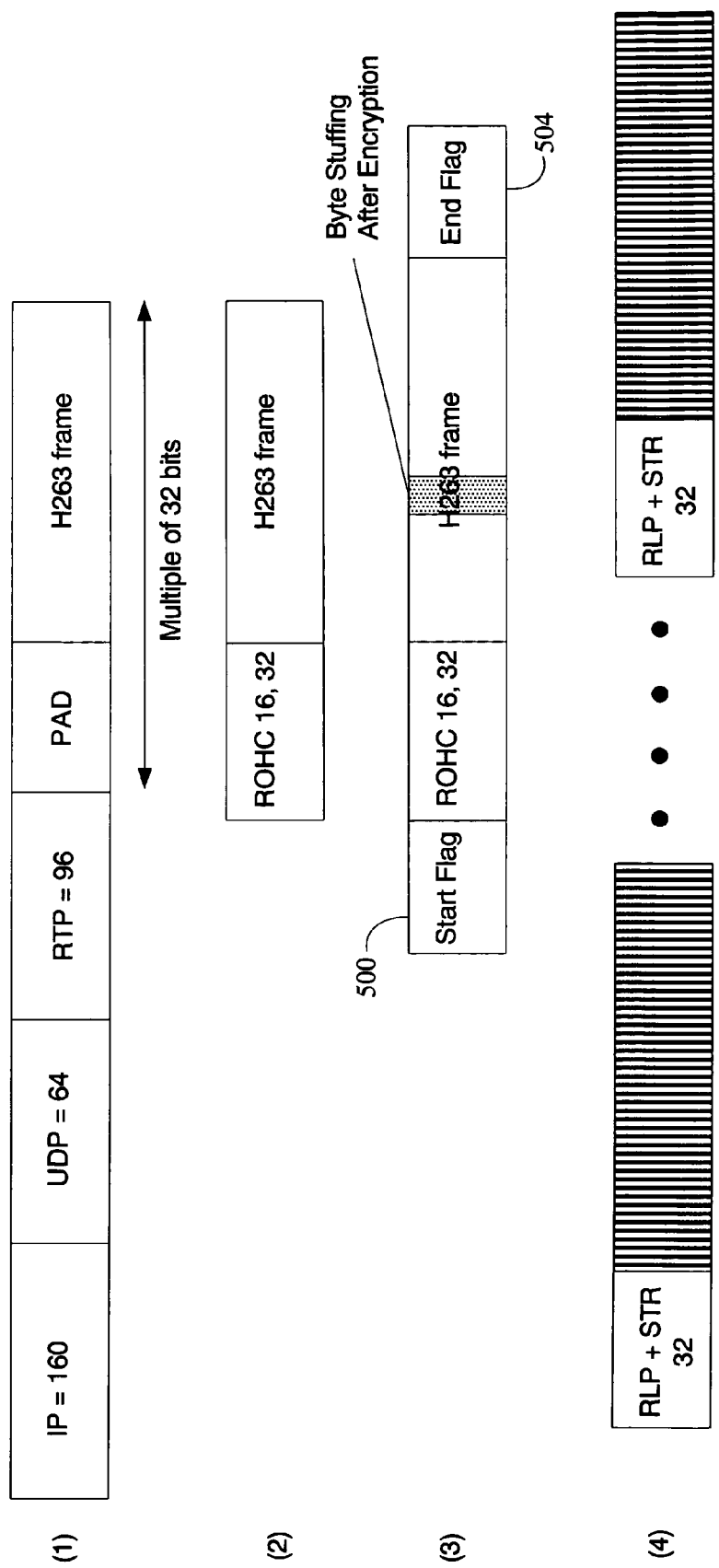
FIG. 5 is a simplified representation of a video packet traversing a 1×EVDO security layer, in accordance with one embodiment of the present invention.

In FIG. 5, an example of implicit message authentication applied to a video frame packet is shown. In this example, the wireless communication system is a 1×EVDO network, and the air-application frame, indicated at step 3, will not fit into one physical layer frame. Rather than using an explicit length indicator, as described above, start and end flags 500 and 504, respectively, are added to the packet. Due to the size of the air-interface application layer packet, at step 4, RLP fragments the packet before transmission over the wireless link.

The aforementioned encryption mechanisms are equally applicable with explicit message authentication mechanisms, such as, for example, SHA-1. For best effort data that is not ordinarily burdened with delay requirements, this is likely a desirable alternative to explicit message authentication. Under this approach, an explicit authentication tag is computed and appended to the packets transmitted to the receiver. However, as described above, the encryption mechanism may use the aforementioned cryptosynch procedures, thus providing the benefits of not having to append the packets with an explicit cryptosynch.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of encrypting data for transmission over a wireless link, comprising:
   encrypting one or more blocks of data, at an air-interface application layer, using an encryption algorithm that receives a cryptosynch as input, wherein each block of data includes a plurality of bytes associated with a corresponding plurality of sequence numbers, wherein the value of the cryptosynch includes a variable component that is based on an order of the one or more blocks of data relative to other blocks of data and where the variable component comprises an incremented value that is derived at the air-interface application layer, and the variable component of the cryptosynch is recoverable by a receiver based on the ordering of the blocks of data and a value of one of the plurality of sequence numbers; and
   transmitting the one or more encrypted blocks of data to a receiver that is operable to preserve the order of the one or more blocks of data relative to the other blocks of data.

2. The method of claim 1, wherein the one or more blocks of data is comprised of a predetermined number of bits from a stream of data, and the method further comprises:
   computing the cryptosynch for the one or more blocks of data, wherein the variable component is derived from a block number of a virtual counter.

3. The method of claim 2, wherein the one or more blocks of data comprises a selectable bit length comprised of the predetermined number of bits.

4. The method of claim 3, wherein the predetermined number of bits is 128 bits.

5. The method of claim 2, wherein the virtual counter is configured to increment the block number, for each of the one or more blocks in the stream of data, after the predetermined number of bits have been received, and wherein the virtual counter is configured to be initialized based on the value of said one of the plurality of sequence numbers.

6. The method of claim 2, further comprising:
   resetting the virtual counter to a predetermined initial value for a communication session with the receiver.

7. The method of claim 2, wherein the cryptosynch is comprised of a fixed component that is based on control information that accompanies the one more blocks of data.

8. The method of claim 1, wherein encrypting the one or more blocks of data further comprises:
   generating a pseudorandom stream from the encryption algorithm, wherein the pseudorandom stream is capable of being reproduced by the receiver using a corresponding encryption algorithm and the recovered value of the cryptosynch; and
   executing a logical XOR between corresponding bytes of the pseudorandom stream and the one or more blocks of data.

9. The method of claim 1, wherein encrypting the one or more blocks of data further comprises:
   generating a first pseudorandom stream from the encryption algorithm using a first value of the cryptosynch;
   generating a second pseudorandom stream from the encryption algorithm using a second value of the cryptosynch; and
   encrypting the one or more blocks of data by performing an operation $Y=AX+B$ in a finite field, where A is the first pseudorandom stream, B is the second pseudorandom stream, X is the one or more blocks of data, and Y is an encrypted block of data produced from the operation.

10. The method of claim 9, further comprising:
    appending the one or more blocks of encrypted data with a start flag and an end flag, wherein the start and end flags are operable to signal to the receiver a beginning and an end of the one or more blocks of encrypted data.

11. The method of claim 9, wherein the first pseudorandom stream and the second pseudorandom stream are capable of being reproduced by a receiver using a corresponding encryption algorithm and first and second recovered values of the cryptosynch, respectively, and using the reproduced first and second pseudorandom streams, the receiver is capable of decrypting the one or more blocks of data by performing an operation $X=A^{-1}(Y+B)$.

12. The method of claim 1, wherein encrypting the one or more blocks of data comprises encrypting the one or more blocks of data using the Advanced Encryption Standard.

13. The method of claim 1, further comprising:
    appending the one or more blocks of encrypted data with a start flag and an end flag, wherein the start and end flags are operable to signal to the receiver a beginning and an end of the one or more blocks of encrypted data.

14. The method of claim 13, wherein the receiver is operable to determine a bit length of the one or more blocks of encrypted data by counting the number of bits between the flags.

15. The method of claim 14, wherein the start and end flags are comprised of a first bit sequence, the method further comprising:
    determining if the one or more blocks of data includes a second bit sequence that matches the first bit sequence; and
    if a match is found, replacing the second bit sequence with a third bit sequence that is different from the first bit sequence.

16. A method of decrypting data received over a wireless link, comprising:
    receiving at least one packet used to transmit one or more encrypted blocks of data over the wireless link, wherein each block of data includes a plurality of bytes associated with a corresponding plurality of sequence numbers, wherein the one or more blocks of data has been encrypted using an encryption algorithm that receives a cryptosynch as input, and the value of the cryptosynch includes an air-interface application layer derived, incremented variable component that is based on an order of the at least one encrypted block of data relative to other blocks of data and a value of one of the plurality of sequence numbers; and at an air-interface application layer, recovering the variable component of the cryptosynch for the at least one encrypted block of data from the ordering of the one or more blocks of data relative to other blocks of data.

17. The method of claim 16, further comprising:
insuring that the ordering of the at least one encrypted block of data relative to the other blocks of data is synchronized with the order in which it was transmitted.

18. The method of claim 16, wherein recovering the variable component of the cryptosynch further comprises:
recovering the variable component of the cryptosynch by determining a start value of the virtual counter, wherein the start value is based on the ordering of the at least one encrypted block of data relative to the other blocks of data and the value of said one of the plurality of sequence numbers.

19. The method of claim 18, wherein the variable component of the cryptosynch is equal to the block count of the virtual counter.

20. The method of claim 18, further comprising:
incrementing the start value for each successive block of the ordered at least one encrypted block of data.

21. The method of claim 16, wherein the cryptosynch comprises a fixed component that is inferred from control information that accompanies the at least one packet.

22. The method of claim 16, further comprising:
decrypting the at least one encrypted block of data using the recovered cryptosynch.

23. The method of claim 22, wherein decrypting the one or more blocks of encrypted data further comprises:
generating a pseudo random stream from an encryption algorithm used to encrypt the one or more blocks of data, wherein the encryption algorithm uses the recovered cryptosynch as an input; and
executing a logical XOR between corresponding bytes of the at least one encrypted block of data and the pseudo random stream.

24. The method of claim 22, wherein decrypting the at least one encrypted block of data further comprises:
generating a first pseudorandom stream from the encryption algorithm, wherein the encryption algorithm uses a first recovered value of the cryptosynch;
generating a second pseudorandom stream from the encryption algorithm, wherein the encryption algorithm uses a second recovered value of the cryptosynch; and
decrypting the at least one encrypted block of data by performing an operation $X=A^{-1}(Y+B)$ in a finite field, where A is the first pseudorandom stream, B is the second pseudorandom stream, Y is the at least one encrypted block of data, and X is an unencrypted block of data.

25. The method of claim 24, wherein the at least one encrypted block of data includes a start flag and an end flag to signal the beginning and the end of the at least one encrypted block of data, the method further comprising:
determining a bit length of the one or more blocks of encrypted data by counting the number of bits between the flags.

26. The method of claim 16, wherein the start and end flags are comprised of a first bit sequence, and prior to receiving the at least one packet, a second bit sequence matching the first bit sequence in the one or more blocks of data was replaced with a third bit sequence that is different from the first bit sequence, the method further comprising:
restoring the one more blocks of data by replacing the third bit sequence with the first bit sequence.

27. The method of claim 25, wherein the start and end flags are comprised of a first bit sequence, and prior to receiving the at least one packet, a second bit sequence matching the first bit sequence in the at least one block of data was replaced with a third bit sequence that is different from the first bit sequence, the method further comprising:
restoring the one or more blocks of data by replacing the third bit sequence with the first bit sequence.

28. A method of encrypting data in a wireless network comprising:
generating a first pseudorandom stream from an encryption algorithm using a first value of a cryptosynch;
generating a second pseudorandom stream from the encryption algorithm using a second value of the cryptosynch; and
encrypting at least one block of data by performing an operation $Y=AX+B$ in a finite field, where A is the first pseudorandom stream, B is the second pseudorandom stream, X is the at least one block of data, and Y is an encrypted block of data produced from the operation.

29. The method of claim 28, wherein the first and second values of the cryptosynch are based on an order of the at least one block of data relative to other blocks of data.

30. The method of claim 28, wherein the at least one block of data is comprised of a predetermined number of bits from a stream of data, and the method further comprises:
computing the first and second values of the cryptosynch for the at least one block of data, wherein the first and second values of the cryptosynch are comprised of a variable component that is derived from a block number of a virtual counter.

31. The method of claim 30, wherein the virtual counter is configured to increment the block number, for each of the at least one blocks in the stream of data, after the predetermined number of bits have been received.

32. The method of claim 31, wherein the at least one block of data is comprised of 128 bits.

33. The method of claim 30, wherein the first and second values of the cryptosynch are comprised of a modifier, and the first value of the cryptosynch is comprised of the variable component appended with a first value of the modifier, and the second value of the cryptosynch is comprised of the variable component appended with a second value of the modifier.

34. The method of claim 30, wherein the first and second values of the cryptosynch are comprised of a fixed component.

35. The method of claim 28, wherein the first pseudorandom stream and the second pseudorandom stream are capable of being reproduced by a receiver using a corresponding encryption algorithm and first and second recovered values of the cryptosynch, respectively, and using the reproduced first and second pseudorandom streams, the receiver is capable of decrypting the at least one block of data by performing an operation $X=A^{-1}(Y+B)$.

36. The method of claim 28, wherein the encryption algorithm is the Advanced Encryption Standard.

37. A method of decrypting data in a wireless network comprising:
receiving at least one block of encrypted data, wherein the at least one block has been encrypted by performing an operation $Y=AX+B$ in a finite field, where A is a first pseudorandom stream, B is a second pseudorandom stream, X is at least one block of unencrypted data, and Y is the at least one block of encrypted data; and reproducing the first and second pseudorandom streams and decrypting, at an air-interface application layer, the at least one block of encrypted data by performing an operation $X=A^{-1}(Y+B)$.

38. The method of claim 37, wherein the first and second pseudorandom streams are reproduced from an encryption algorithm using a cryptosynch, and the cryptosynch is comprised of a variable component that is based on an order of the at least one block of encrypted data relative to other blocks of encrypted data.

39. The method of claim 38, wherein the variable component of the cryptosynch is derived from a block number of a virtual counter that is incremented after a predetermined number of bits have been received.

40. The method of claim 38, wherein the first and second pseudorandom streams are reproduced from the encryption algorithm using first and second values of the cryptosynch, respectively, and the first value of the cryptosynch is comprised of the variable component appended with a first value of a modifier, and the second value of the cryptosynch is comprised of the variable component appended with a second value of the modifier.

41. The method of claim 38, wherein the cryptosynch is comprised of a fixed component.

42. The method of claim 37, wherein the encryption algorithm is the Advanced Encryption Standard.

* * * * *